US008824830B2

(12) United States Patent
Le Meur et al.

(10) Patent No.: US 8,824,830 B2
(45) Date of Patent: Sep. 2, 2014

(54) METHOD FOR ASSESSING THE QUALITY OF A DISTORTED VERSION OF A FRAME SEQUENCE

(75) Inventors: Olivier Le Meur, Talensac (FR); Alexandre Ninassi, Osse (FR); Patrick Le Callet, le Pallet (FR); Dominique Barba, Carquefou (FR)

(73) Assignee: Thomson Licensing, Boulogne, Billancourt (FR)

( * ) Notice: Subject to any disclaimer, the term of this patent is extended or adjusted under 35 U.S.C. 154(b) by 966 days.

(21) Appl. No.: 12/386,900

(22) Filed: Apr. 24, 2009

(65) Prior Publication Data
US 2009/0274390 A1 Nov. 5, 2009

(30) Foreign Application Priority Data

Apr. 30, 2008 (EP) ..................................... 08305139

(51) Int. Cl.
*G06K 9/40* (2006.01)
*H04N 17/00* (2006.01)
*G06T 7/00* (2006.01)
*H04N 7/26* (2006.01)

(52) U.S. Cl.
CPC ...... *H04N 17/00* (2013.01); *G06T 2207/10016* (2013.01); *G06T 2207/30168* (2013.01); *G06T 7/0002* (2013.01); *H04N 17/004* (2013.01); *H04N 19/00933* (2013.01)
USPC ....................................................... 382/275

(58) Field of Classification Search
CPC ................. H04N 17/004; H04N 17/00; G06T 2207/30168
USPC ....................................................... 382/275
See application file for complete search history.

(56) References Cited

U.S. PATENT DOCUMENTS 5,574,500 A * 11/1996 Hamada et al. ............... 348/180
5,790,717 A * 8/1998 Judd .............................. 382/323
6,125,144 A * 9/2000 Matsumura et al. ..... 375/240.12
(Continued)

FOREIGN PATENT DOCUMENTS

| EP | 1622395 A1 * | 2/2006 | ............. H04N 17/04 |
| EP | 1804519 A1 | 7/2007 | |
| EP | 2114078 A1 * | 11/2009 | ............. H04N 17/00 |

OTHER PUBLICATIONS

Winkler S: "Visual Quality Assessment Using a Contrast Gain Control Model" Multimedia Signal Processing, 1999 IEEE 3rd Workshop on Copenhagen, Denmark Sep. 13-15, 1999, Piscataway, NJ, USA IEEE, US, Sep. 13, 1999, pp. 527-532, XP010351742 ISBN: 978-0-7803-5610-9 Distortion maps.

*Primary Examiner* — Gandhi Thirugnanam
(74) *Attorney, Agent, or Firm* — Jeffrey D. Carter

(57) ABSTRACT

A method for assessing the quality of a distorted version of a frame sequence includes the steps of determining a last spatial distortion by comparing a block of a last frame (I6) of the sequence with a corresponding block of the distorted version of the last frame, determining, in a last-but-one frame, a best-matching block matching said block of the last frame best, determining a last-but-one spatial distortion by comparing the determined best-matching block of the last-but-one frame with a corresponding block of the distorted version of the last-but-one frame, determining a spatio-temporal perceptual distortion value associated with said block using said determined distortions and using the determined spatio-temporal perceptual distortion value for assessing the quality.

3 Claims, 4 Drawing Sheets

(56) References Cited

U.S. PATENT DOCUMENTS

| | | | |
|---|---|---|---|
| 6,239,834 B1* | 5/2001 | Miyaji et al. | 348/193 |
| 6,259,477 B1* | 7/2001 | Hu | 348/180 |
| 6,285,797 B1* | 9/2001 | Lubin et al. | 382/254 |
| 6,307,980 B1* | 10/2001 | Quacchia | 382/268 |
| 6,483,538 B2* | 11/2002 | Hu | 348/180 |
| 6,496,221 B1* | 12/2002 | Wolf et al. | 348/192 |
| 6,577,764 B2* | 6/2003 | Myler et al. | 382/228 |
| 6,734,898 B2* | 5/2004 | Zeidler | 348/183 |
| 6,798,919 B2* | 9/2004 | Ali et al. | 382/272 |
| 7,102,667 B2* | 9/2006 | Ferguson | 348/180 |
| 7,133,066 B2* | 11/2006 | Bourret | 348/180 |
| 7,197,075 B2* | 3/2007 | Akimoto et al. | 375/240.16 |
| 7,551,198 B2* | 6/2009 | Kawada et al. | 348/192 |
| 7,663,636 B2* | 2/2010 | Kim et al. | 345/581 |
| 7,812,857 B2* | 10/2010 | Bourret | 348/180 |
| 7,865,035 B2* | 1/2011 | Lin et al. | 382/275 |
| 2002/0114393 A1* | 8/2002 | Vleeschouwer | 375/240.16 |
| 2003/0011679 A1* | 1/2003 | Jung et al. | 348/181 |
| 2003/0026338 A1* | 2/2003 | Yan | 375/240.08 |
| 2003/0031368 A1* | 2/2003 | Myler et al. | 382/228 |
| 2003/0112333 A1* | 6/2003 | Chen et al. | 348/192 |
| 2003/0161406 A1* | 8/2003 | Lee | 375/240.19 |
| 2004/0091046 A1* | 5/2004 | Akimoto et al. | 375/240.12 |
| 2004/0114685 A1* | 6/2004 | Kouloheris et al. | 375/240.03 |
| 2004/0184530 A1* | 9/2004 | Cheng | 375/240.01 |
| 2005/0243910 A1* | 11/2005 | Lee et al. | 375/240.01 |
| 2006/0276983 A1* | 12/2006 | Okamoto et al. | 702/69 |
| 2007/0230571 A1* | 10/2007 | Kodama | 375/240.12 |
| 2007/0297516 A1* | 12/2007 | Lee | 375/240.19 |
| 2008/0143837 A1* | 6/2008 | Okamoto et al. | 348/180 |
| 2008/0165278 A1* | 7/2008 | Zhang | 348/452 |
| 2008/0285651 A1* | 11/2008 | Au et al. | 375/240.16 |
| 2009/0103813 A1* | 4/2009 | Le Meur et al. | 382/199 |
| 2009/0274390 A1* | 11/2009 | Meur et al. | 382/275 |
| 2010/0033584 A1* | 2/2010 | Watanabe | 348/208.13 |
| 2010/0284624 A1* | 11/2010 | Ninassi et al. | 382/224 |
| 2011/0007968 A1* | 1/2011 | Yamada | 382/165 |
| 2012/0020415 A1* | 1/2012 | Yang et al. | 375/240.27 |
| 2013/0100350 A1* | 4/2013 | Gu et al. | 348/571 |
| 2013/0182135 A1* | 7/2013 | Kamoshida et al. | 348/208.6 |

* cited by examiner

METHOD FOR ASSESSING THE QUALITY OF A DISTORTED VERSION OF A FRAME SEQUENCE

This application claims the benefit, under 35 U.S.C. §119, of European Patent Application No. 08305139.1 of 30 Apr. 2008.

FIELD OF THE INVENTION

The invention is related to a method for assessing the quality of a distorted version of a frame sequence.

BACKGROUND OF THE INVENTION

When image or frame sequences like video or film are compressed distortions are introduced in the compressed frame sequence. Errors introduced by transmission over a noisy or distorted channel may be another source of distortion.

For evaluating the quality of a distorted version of a frame sequence a video quality metric is necessary.

Well known mathematical metrics for measuring distances between an original and a distorted version, like mean square error or maximum absolute error, do not take into account the psychological aspects of distortions. That is, some distortions are more visible and thus more annoying to users than other distortions although the may all result in the same measured distance between distorted version and original.

Furthermore, the duration of a distortion plays a vital role with respect to the degree of annoyance the distortion introduces.

European Patent Application EP 1 804 519 describes a video quality objective assessment device for estimating subjective quality, said device includes a temporal/spatial feature amount derivation unit which derives a temporal/spatial feature amount which is the feature amount of deterioration.

There is a need for a method for assessing the quality of a distorted version of a frame sequence which reflects the influence of the human perceptive system better.

SUMMARY OF THE INVENTION

This is achieved by a method for assessing the quality of a distorted version of a frame sequence, said method comprising the steps of a) determining a last spatial distortion by comparing a block of a last frame of the sequence with a corresponding block of the distorted version of the last frame, b) determining, in a last-but-one frame, a best-matching block matching said block of the last frame best, c) determining a last-but-one spatial distortion by comparing the determined best-matching block of the last-but-one frame with a corresponding block of the distorted version of the last-but-one frame d) determining a spatio-temporal perceptual distortion value associated with said block using said determined distortions and using the determined spatio-temporal perceptual distortion value for assessing the quality.

By taking the temporal evolution of the spatial distortion associated with a block into account, the quality of the distorted video is assessed better.

The dependent claims describe advantageous embodiments of the method.

For instance, using said determined spatial distortions comprises using a first distortion gradient between the last and the last-but-one spatial distortion.

Or, the method further comprises iterating steps e) and f) through a number of frames preceding the last frame and using all determined spatial distortions for determining said spatio-temporal perceptual distortion value wherein using comprises using distortion gradients between consecutive frames.

If said first difference meets or exceeds a threshold, steps e) and f) are iterated through a first number of frames, otherwise, steps e) and f) are iterated through a second number of frames, said second number being smaller than said first number.

The method may further comprise counting a number of sign changes between the determined consecutive distortion gradients, determining a maximum among the determined distortion gradients and using said number of sign changes and said maximum for determining said spatio-temporal perceptual distortion value.

In an embodiment, the last frame (I6) is partitioned into disjoint blocks and spatio-temporal perceptual distortion values are determined for each of said disjoint blocks. This allows for using the determined spatio-temporal perceptual distortions for determining a frame quality score for the last frame.

The method may even further comprise determining a frame quality score for each frame of the frame sequence, determining an average of the determined frame quality scores and using the determined average for assigning said quality.

BRIEF DESCRIPTION OF THE DRAWINGS

Exemplary embodiments of the invention are illustrated in the drawings and are explained in more detail in the following description.

In the figures.

DETAILED DESCRIPTION OF PREFERRED EMBODIMENTS

Figure 1:
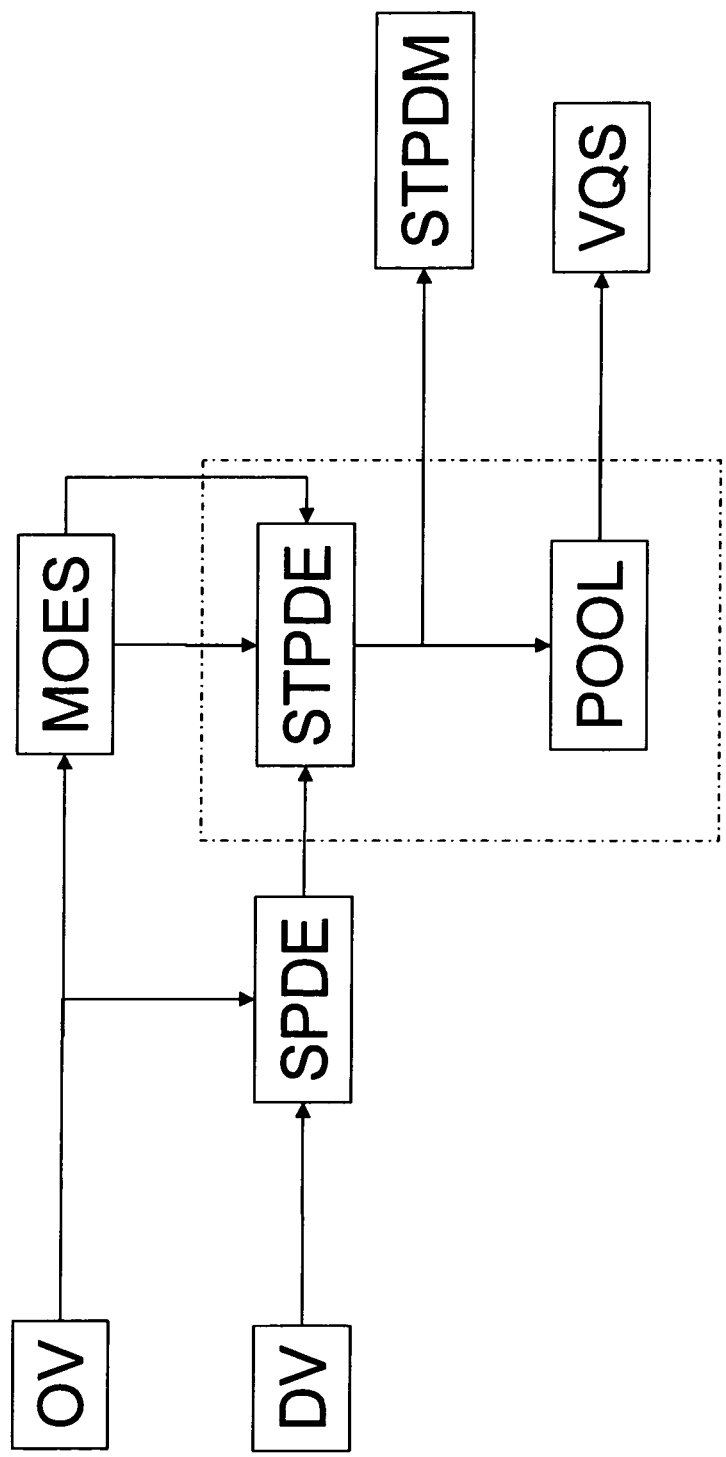
FIG. 1 shows an exemplary embodiment of the claimed invention

FIG. 1 shows an exemplary embodiment of the claimed invention. An original video OV is inputted into a motion estimation module MOES which outputs dominant motion parameters and motion vectors. A distorted version of the video DV is inputted into a spatial perceptual distortion evaluation module SPDE which outputs spatial perceptual distortion maps. Each spatial perceptual distortion map comprises distortion values associated with the pixels of one of the frames of the video. The spatial perceptual distortion maps, the motion parameters and the motion vectors are inputted into a spatio-temporal perceptual distortion evaluation module STPDE which outputs spatio-temporal perceptual distortion maps STPDM. Said spatio-temporal perceptual distortion maps STPDM are inputted into a pooling module POOL and may be used for other purposes, also.

The pooling module POOL then outputs video quality score VQS.

Figure 2:
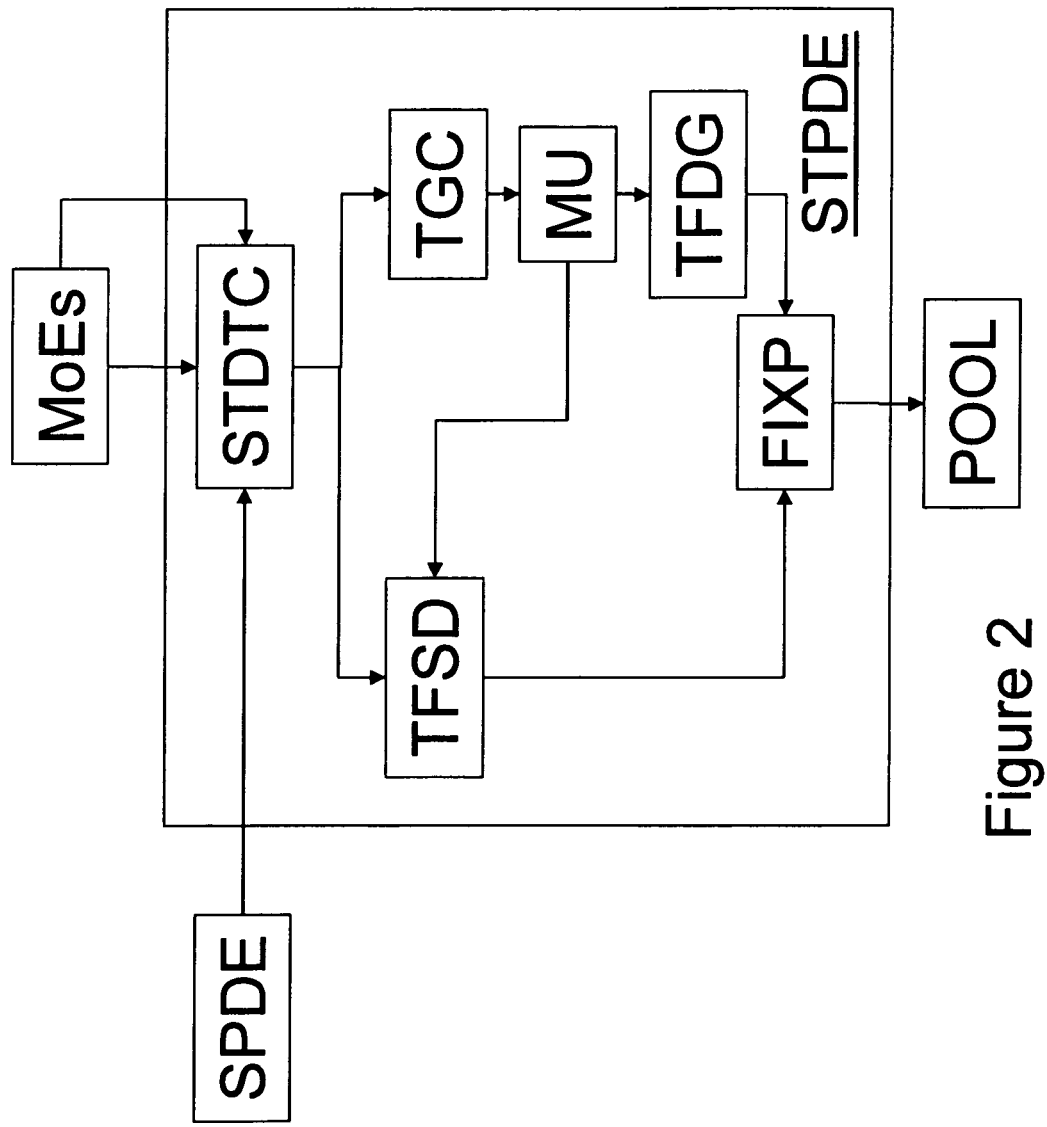
FIG. 2 shows an exemplary embodiment of the inventive spatio-temporal distortion evaluation module

FIG. 2 shows an exemplary embodiment of the inventive spatio-temporal distortion evaluation module STPDE in more detail. The module STPDE comprises a sub-module STDTC which is responsible for creating so-called spatial distortion tubes associated with so-called block tubes TUBE. Said spatial distortion tubes are fed into two sub-modules TGC and TFSD. Sub-module TGC generates a so-called gradient tube from an inputted spatial distortion tube. The gradient tube is evaluated in sub-module MU whether it meets or exceeds a threshold. In dependency on the result one of at least two possible time parameter values which is provided to sub-module TFSD. Sub-module TFSD generates a so-called temporal filtered distortion tube from an inputted spatial distortion tube by temporarily filtering the inputted tube using the time parameter provided by module TGC.

The gradient tube generated by sub-module TGC is temporally filtered in sub-module TFDG. The temporally filtered gradient tube and the temporally filtered distortion tube are inputted into a sub-module for fixation pooling FIXP which outputs said spatio-temporal perceptual distortion maps STPDM.

Figure 3:
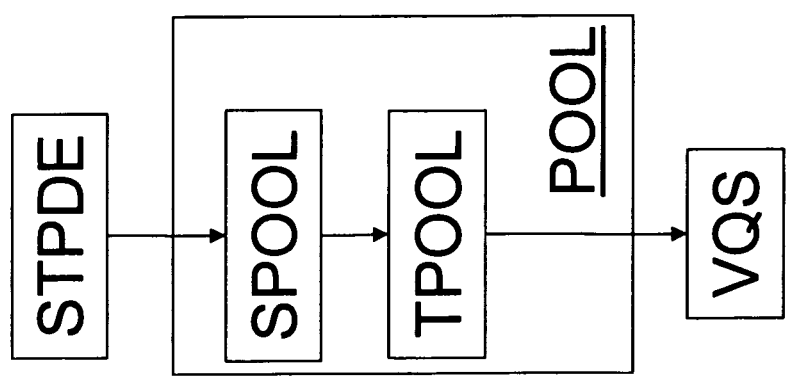
FIG. 3 shows an exemplary embodiment of the inventive pooling module FIG. 4 exemplarily depicts a spatio-temporal distortion tube and FIG. 5 exemplarily depicts a convolution function used for temporal filtering of distortion gradients.

FIG. 3 shows an exemplary embodiment of the inventive pooling module POOL in more detail. Said pooling module POOL comprises a sub-module for spatial pooling SPOOL and a sub-module for temporal pooling TPOOL. The spatial pooling SPOOL generates a frame quality score for each frame from the spatio-temporal perceptual distortion maps which it receives as input. Said frame quality scores are combined into a video quality score VQS in sub-module TPOOL. Thus, the pooling module POOL performs the steps of calculating quality scores for the individual frames as well as for the whole video sequence from the spatio-temporal perceptual distortion maps.

The steps performed by the modules and sub-modules are explained in more detail, below.

The step performed in the Spatial Perceptual Distortion Evaluation module SPDE is the computation of spatial perceptual distortion maps $VE_{t,x,y}$. For each frame t of the video sequence, a spatial perceptual distortion map is computed. Each entry (x,y) of this spatial distortion maps represents the degree of distortion that is perceived between a pixel at position (x,y) in the original frame and a distorted version of the pixel at the same position in the distorted version of the frame. In an exemplary embodiment, the degree of distortion is determined by help of a distortion measure described in a previous invention filed as European Patent Application, filing No. 08300006.7, which is enclosed entirely into this application by reference. Others well-known metric may be used in addition or alternatively. Such other metrics are, for instance, Mean Square Error (MSE), Peak-Signal-to-Noise-Ratio (PSNR) or Structural SIMilarity (SSIM).

Prior to, in parallel to or after calculating the spatial perceptual distortion maps $VE_{t,k,l}$, the step of motion estimation in the original video frame sequence is performed. For the blocks of a frame, corresponding best matching blocks in an immediately preceding frame and corresponding replacement or motion vectors are determined. From said motion vectors, dominant motion parameters are calculated. Dominant motion parameters may be determined by different means such as, for instance, Least-Mean Square or algorithm belonging to the family of the M-estimator.

These steps (dominant motion and motion vectors estimation) may be achieved with a Hierarchical motion estimator (HME).

The steps performed in modules SPDE and MOES are necessary for obtaining the spatial distortion maps and the motion information required for the inventive spatio-temporal perceptual distortion evaluation.

The step performed in the Spatio-temporal Perceptual Distortion Evaluation module STPDE is calculation of spatio-temporal perceptual distortion maps $\overline{VE}_{t,k,l}$ from the spatial distortion maps and the motion information. The spatio-temporal perceptual distortion maps $\overline{VE}_{t,k,l}$ comprise spatio-temporal perceptual distortion values associated with blocks. This step comprises determining temporally filtered spatial distortion maps $\overline{VE}_{t,k,l}$ by filtering the spatial distortions determined for blocks of a frame with spatial distortions determined for corresponding predecessor blocks in a preceding frame, said predecessor blocks being determined by help of the motion information. E.g., for each block a weighted sum of the block's spatial distortion and of the corresponding predecessor block's spatial distortion is determined by said filtering. Furthermore, temporal distortion gradient maps $GR_{t,k,l}$ are determined. Each entry (k,l) of these temporal gradient distortion maps $GR_{t,k,l}$ represents the difference in the degree of distortion determined for a block at position (k,l) in the frame t and the degree of distortion determined for a predecessor block of said block at position (k,l), said predecessor block being in the preceding frame.

From the temporally filtered spatial distortion maps $\overline{VE}_{t,k,l}$ and the temporal gradient maps $GR_{t,k,l}$, spatio-temporal perceptual distortion maps $\overline{VE}_{t,k,l}$ are computed.

The time horizon used for temporal filtering may be chosen according to computational or other requirements. That is, predecessors of said predecessor blocks may be determined by help of the motion information and the spatial distortions determined for said predecessors of predecessor blocks may be used for filtering, too. More generally, spatial distortions determined for antecedent blocks from all frames that precede a given frame within the time horizon may be used for temporally filtering spatial distortions determined for blocks of the given frame. Exemplarily, the time horizon is set to 400 ms which corresponds to the time scale of the human eye fixation.

Figure 4:
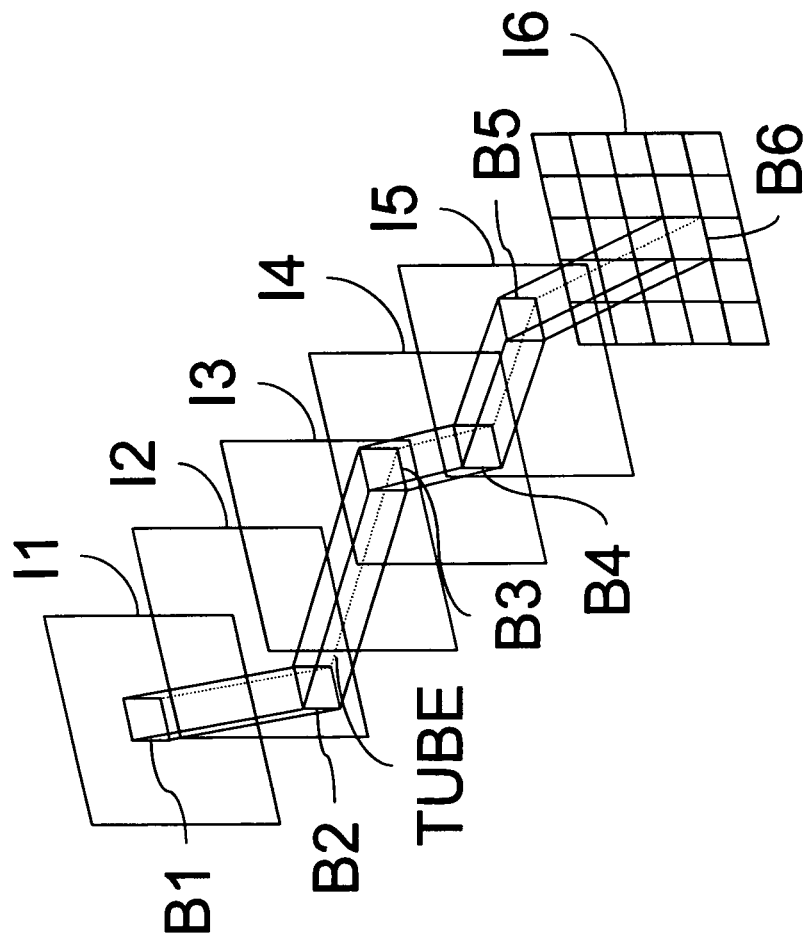

This concept is exemplarily depicted in FIG. 4. The figure depicts an example series or sequence of images or frames I1 . . . I6. A path or history TUBE, also called a block tube, of an arbitrarily chosen block B6 of the last frame I6 is depicted as a rectangular tube. Only the block tube TUBE of arbitrarily chosen block B6 is depicted but corresponding block tubes are formed for all the disjoint blocks of the last frame I6. The block tube TUBE associated with arbitrarily chosen block B6 is determined by a series of best-matching blocks B5, B4, B3, B2, B1 wherein a first best-matching block B5 in last-but-one frame I5 matches said arbitrarily chosen block B6 in last frame I6 best. A second best-matching block B4 in last-but-two frame I4 matches said best-matching block of last frame I6 best, and so on, up to a fifth best-matching block B1 in last-but-five frame I1 matching a fourth best-matching block B2 of last-but-four frame I2 best. Said fourth best-matching block B2 in last-but-four frame I2 matches a third best-matching block B3 of last-but-tree frame I3 best which matches said second best-matching block B4 of last-but-two frame I4 best.

Furthermore, the time horizon may be shortened if the object inside the block appears or disappears in the scene. A method to detect the appearance or the disappearance of an object rests on the use of the dominant motion. Indeed, each block is classified by comparing is motion with a parametric dominant motion: it means that each block is either inlier or outlier to the dominant motion. A classification of inlier-outlier-change of a block between two consecutive frames means the appearance or the disappearance of the object it belongs to, and so indicates the limit of the temporal horizon of this block.

Corresponding to the block tube TUBE there are a spatial distortion tube $VE_{t,k,l}^{tube}$ and a distortion gradient tube $GR_{t,k,l}^{tube}$. The spatial distortion tube $VE_{t,k,l}^{tube}$ is a sequence of the spatial distortion values associated with the blocks in the block tube TUBE. And the distortion gradient tube $GR_{t,k,l}^{tube}$ is a sequence of the differences between consecutive spatial distortions in the spatial distortion tube. Therefore, the distortion gradient tube $GR_{t,k,l}^{tube}$ comprises one element less than the spatial distortion tube or the block tube TUBE.

In a block tube TUBE, the distortion gradient at time instant $t_i$ is computed as follows:

$$Gr_{t_i,k,l}^{tube} = VE_{t_i,k,l}^{tube} - VE_{t_{i-1},k,l}^{tube} \qquad (1)$$

wherein $VE_{t_i,k,l}^{tube}$ is the distortion value at instant $t_i$, $VE_{t_{i-1},k,l}^{tube}$ is the distortion value at instant $t_i-1$ and $t_i$ is comprised in the time horizon.

The spatial distortion tube associated with arbitrarily chosen block B6 is used for filtering the spatial distortion associated with said block B6. That is, spatial distortions determined for said best-matching blocks are used for temporally filtering the spatial distortion of the arbitrarily chosen block B6. Said filtering may be recursive, that is, temporally filtered spatial distortions determined for said best-matching blocks are used for temporally filtering the spatial distortion of the arbitrarily chosen block B6.

The temporal filtering of spatial distortions may further depend on a time parameter adjusting the influence of the spatial distortions or the temporally filtered spatial distortions of predecessors on the filtering in dependency on their distance in time to a frame under inspection. That is, with a larger time parameter the filtering distortions of all predecessors in the time horizon are influential for filtering while, with a smaller time parameter, filtering is dominated or mainly guided by distortions of predecessors in narrow temporal vicinity of the last frame under inspection.

The time parameter used for filtering arbitrarily chosen block B6 may be adjusted in dependency on the associated distortion gradient tube. If the difference between the spatial distortions determined for arbitrarily chosen block B6 and a block of an immediately preceding frame best-matching said arbitrarily chosen block B6 meets or exceeds a threshold, a first time parameter, for instance 400 ms, is used for temporal filtering. Otherwise, a smaller second time parameter, for instance 200 ms, is used for filtering. In this case, the distortion gradient associated with arbitrarily chosen block B6 may also be set to Zero.

Figure 5:
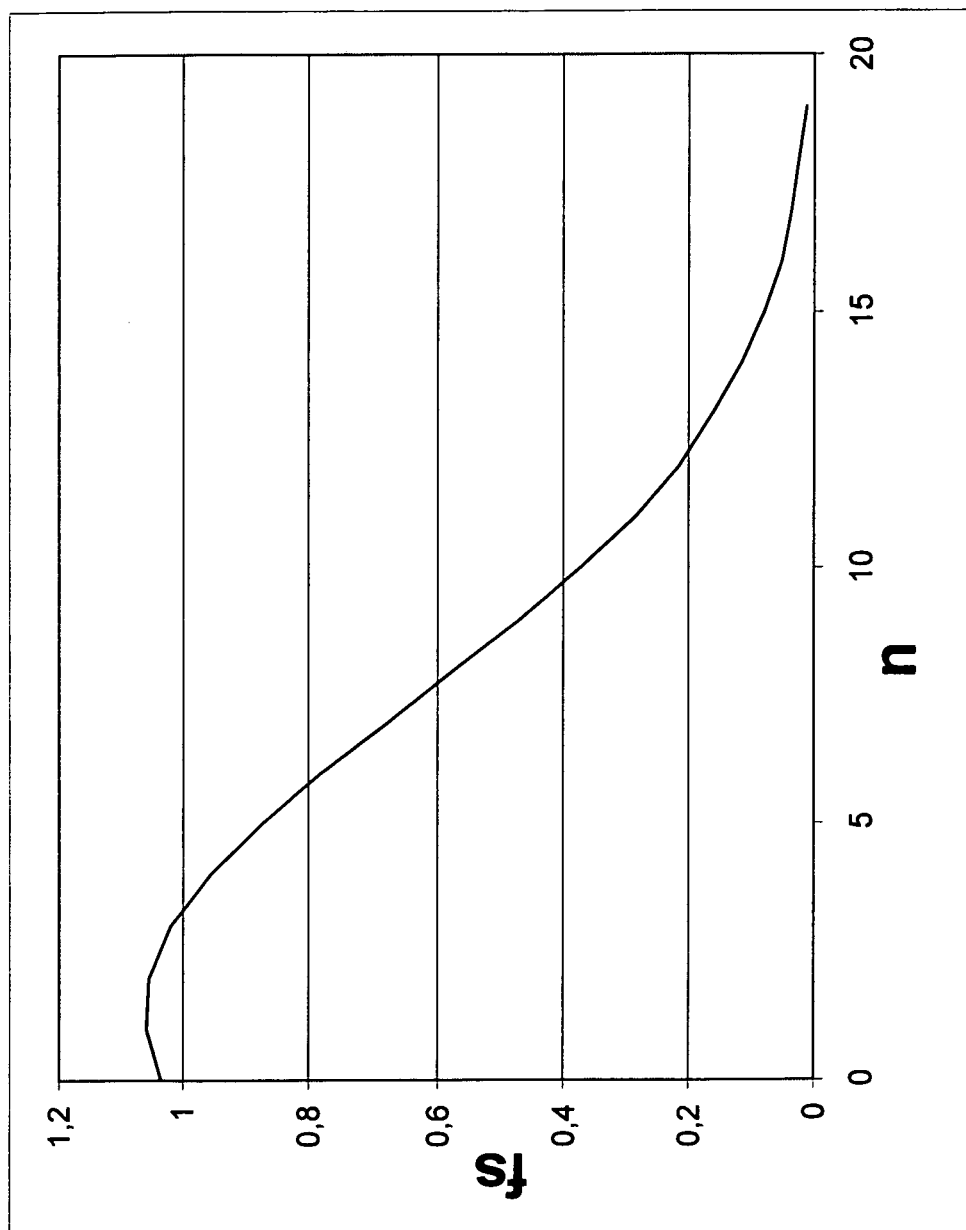

The distortion gradient associated with arbitrarily chosen block B6 may also being subjected to temporal filtering by help of the distortion gradient tube. Said filtering of the distortion gradient is based on a maximum distortion gradient $MaxGr_{t,k,l}^{tube}$ in the distortion gradient tube and the number of sign changes $NS_{t,k,l}^{tube}$ between consecutive distortion gradients in the distortion gradient tube. The number of sign changes is used to weight the maximum distortion gradient. For smoothing, the number of sign changes may be convoluted, for instance with the following Gaussian convolution function which is further exemplarily depicted in FIG. 5:

$$fs(n) = \frac{g_s}{\sigma_s \sqrt{2\pi}} \cdot e^{-\frac{(n-\mu_s)^2}{2\sigma_s^2}} \qquad (2)$$

The function fs( ) gives more importance to temporal distortion at certain sign change frequencies. Good results are achieved with $g_s=16$, $\sigma_s=6$ and $\mu_s=1.3$ but other parameter settings are possible. The result of this step is the map $V\hat{E}_{t,k,l}^{tube}$ where each block (k,l) is the result of the temporal filtering of the distortion gradient in each tube beginning at the frame t.

Then, the temporally filtered distortion gradient associated with a block at position (k,l) in frame t may be obtained following this equation:

$$V\hat{E}_{t,k,l}^{tube} = MaxGr_{t,k,l}^{tube} \cdot fs(NS_{t,k,l}^{tube}) \qquad (3)$$

Sub-module FIXP performs a fixation pooling, in which the map $\overline{VE}_{t,k,l}^{tube}$ and the map $V\hat{E}_{t,k,l}^{tube}$ are combined in order to obtain the final spatio-temporal distortion maps $\overline{VE}_{t,k,l}$. These maps may be computed following this equation:

$$\overline{VE}_{t,k,l} = \overline{VE}_{t,k,l}^{tube} \cdot (\alpha + \beta \cdot V\hat{E}_{t,k,l}^{tube}) \qquad (4)$$

Parameters $\alpha$ and $\beta$ are empirically deduced. For instance, good results where achieved with $\alpha$ being 1 and $\beta$ being 3.

Module POOL is composed of 2 sub-modules, namely a spatial pooling sub-module SPOOL and a temporary pooling sub-module TPOOL as depicted in FIG. 3. Said pooling sub-modules perform the following steps:

First, a frame quality score $Q_t$ is computed from the spatio-temporal distortion maps using a Minkowski summation:

$$Q_t \left( \frac{1}{K \cdot L} \sum_{k=1}^{K} \sum_{l=1}^{L} (\overline{VE}_{t,k,l})^{\beta_p} \right)^{\frac{1}{\beta_p}} \qquad (5)$$

wherein K and L are the height and the width of the spatio-temporal distortion maps respectively, i.e. the vertical and the horizontal number of blocks in the frame at time t, and $\beta_p$ is the Minkowski exponent.

Then, the final video quality score VQS is computed from every frame quality scores $Q_t$ of the video. The final VQS is computed as follows:

$$VQS = \overline{Q} + \min(q_1 \cdot \max(\Delta_t), q_2 \cdot \overline{Q}) \qquad (6)$$

wherein $\overline{Q}$ is the average of $Q_t$ over all frames of the video, and $\max(\Delta_t)$ is a term representing the maximum among the variations of quality along the sequence wherein $\Delta_t$ is:

$$\Delta_t = abs\left( \frac{Q_t - Q_{t-m}}{p} \right) \qquad (7)$$

wherein function abs( ) returns the absolute value of its argument.

Good results where achieved with m=2, p=1, $q_1=1$ . and $q_2=0.5$ but other parameter settings are possible.

The objective quality score VQS is possibly transformed into predicted Mean Observer Score (MOSp) using a psychometric function. The psychometric function is given by:

$$MOSp = \frac{b1}{1 + e^{-b2 \cdot (Q - b3)}} \qquad (7)$$

wherein b1, b2 and b3 are the parameters of the psychometric function which are determined by comparing mean observer scores assigned to videos in a database and objective quality scores VQS calculated for the same videos.

The range of the objective quality score VQS is between [0; 1[, and the range of the MOSp is between [0; 6[.

The corresponding category rating is the following:

5 is imperceptible;
4 is perceptible but not annoying;
3 is slightly annoying;

2 is annoying;
1 is very annoying.

The invention may be used advantageously for assessing video quality for instance in an encoding device to compare a reconstructed video with the corresponding video source.

The invention may further be used advantageously for comparing the performance of encoding devices using different codec.

The perceptual error map computed according to the invention may also be used in an encoding device to locally adapt the decision or the quantification step.

What is claimed is

1. A method for assessing quality of a distorted version of a frame sequence via a hardware device, said method comprising:

for each block to be assessed of a last frame of said frame sequence, a) determining a last spatial distortion by comparing said block to be assessed with a corresponding block of said distorted version of said last frame of said distorted version of said frame sequence, said corresponding block of said distorted version of said last frame being positioned in said distorted version of said last frame at a same position as said block to be assessed;

b) determining a last-but-one spatial distortion by comparing a best-matching block of a last-but-one frame with a corresponding block of said distorted version of said last-but-one frame, said best-matching block of said last-but-one frame being determined using motion estimation; and c) determining a spatio-temporal perceptual distortion value associated with said block to be assessed using said last spatial distortion and said last-but-one spatial distortion for assessing said quality of said block to be assessed;

d) determining, in a last-but-two frame, a further best-matching block matching said best matching block of said last-but-one frame best;

e) determining a last-but-two spatial distortion by comparing said determined further best-matching block of said last-but-two frame with a corresponding block of said distorted version of said last-but-two frame; and iterating steps d) and e) through a number of frames preceding said last frame; and wherein said spatio-temporal perceptual distortion value is determined using a weighted average of all determined spatial distortions and distortion gradients between consecutive frames are used for determining a weight for weighting said spatio-temporal perceptual distortion value.

2. The method according to claim 1, further comprising:

determining whether a first distortion gradient meets or exceeds a threshold; and if said first distortion gradient meets or exceeds said threshold, continuing iterating steps d) and e) through a further number of frames.

3. The method according to claim 1, further comprising:

counting a number of sign changes between determined consecutive distortion gradients; and convolving said number of sign changes, wherein said weight is further proportional to said convolved number of sign changes.

* * * * *